United States Patent [19]

Bradshaw et al.

[11] Patent Number: 4,714,656
[45] Date of Patent: Dec. 22, 1987

[54] SHEET CONTAINING CONTOUR-DEPENDENT DIRECTIONAL IMAGE AND METHOD FOR FORMING THE SAME

[75] Inventors: Thomas I. Bradshaw, Afton; Bruce D. Orensteen; Jack E. Cook, both of St. Paul, all of Minn.

[73] Assignee: Minnesota Mining and Manufacturing Company, St. Paul, Minn.

[21] Appl. No.: 944,458

[22] Filed: Dec. 19, 1986

Related U.S. Application Data

[63] Continuation-in-part of Ser. No. 778,866, Sep. 23, 1985, abandoned.

[51] Int. Cl.⁴ .............. B32B 9/04; G03C 3/00; B65D 33/14
[52] U.S. Cl. ................ 428/411.1; 428/916; 430/10; 430/945; 383/5; 206/807
[58] Field of Search .......... 430/10, 945; 206/807; 383/5; 428/411.1, 916

[56] References Cited

U.S. PATENT DOCUMENTS

| | | | |
|---|---|---|---|
| 3,152,711 | 10/1964 | Mumford et al. | 215/38 |
| 3,154,872 | 11/1964 | Nordgren | 40/135 |
| 3,160,302 | 12/1964 | Chaplin | 215/38 |
| 3,190,178 | 6/1965 | McKenzie | 428/409 |
| 3,443,711 | 5/1969 | Olson | 215/7 |
| 3,503,315 | 3/1970 | de Montebello | 430/311 |
| 3,801,183 | 4/1974 | Sevelin et al. | 350/105 |
| 3,913,772 | 10/1975 | Ochs | 215/256 |
| 4,082,426 | 4/1978 | Brown | 350/105 |
| 4,099,838 | 7/1978 | Cook et al. | 350/105 |
| 4,200,875 | 4/1980 | Galanos | 430/326 |
| 4,446,979 | 5/1984 | Goch | 346/1.1 |
| 4,457,437 | 7/1984 | Heath | 215/203 |
| 4,474,304 | 10/1984 | Jacobs | 220/276 |
| 4,480,749 | 11/1984 | Lauris et al. | 206/459 |

FOREIGN PATENT DOCUMENTS 19824 7/1984 Japan.

Primary Examiner—John E. Kittle
Assistant Examiner—Patrick J. Ryan
Attorney, Agent, or Firm—Donald M. Sell; James A. Smith; Robert H. Jordan

[57] ABSTRACT

A sheet having a set of axial markings viewable as a contour-dependent, directional image. The image is intact only when the sheet is in substantially a predetermined contour and viewed within a predetermined conical field of view. Also a method for forming such sheets.

29 Claims, 6 Drawing Figures

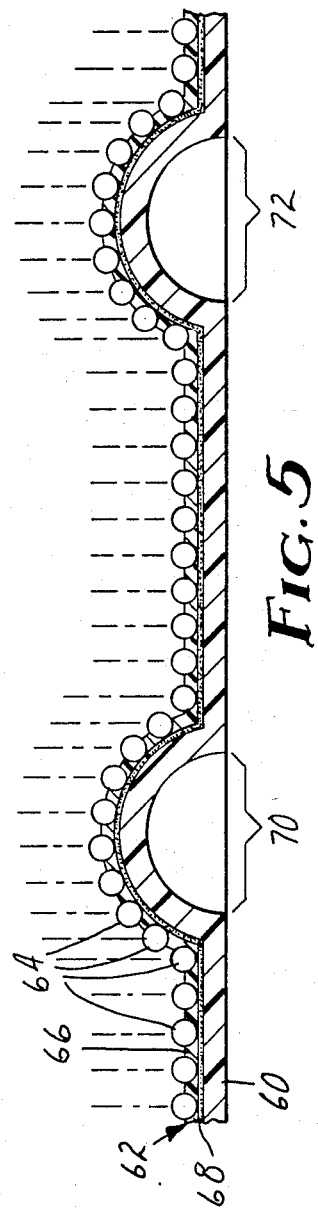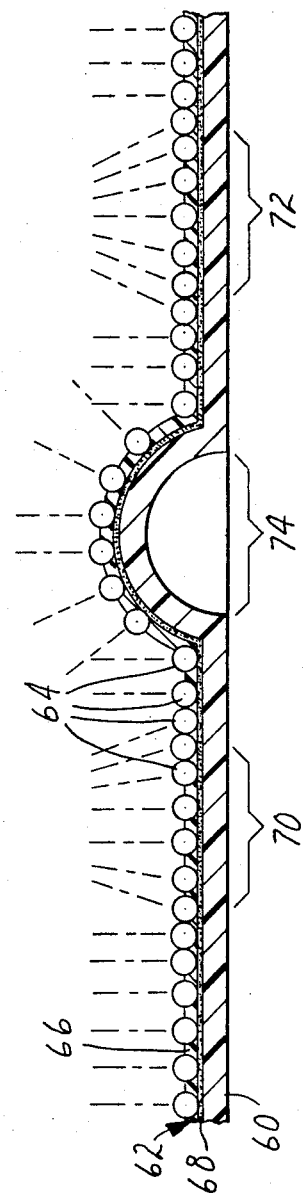

SHEET CONTAINING CONTOUR-DEPENDENT DIRECTIONAL IMAGE AND METHOD FOR FORMING THE SAME

CROSS-REFERENCE TO RELATED APPLICATION

This application is a continuation-in-part of pending application Ser. No. 778,866, filed Sept. 23, 1985 now abnd.

FIELD OF INVENTION

The present invention concerns sheets containing directional images that are viewable only at or within a range centered on a predetermined angle, a region described herein as a conical field of view. The present invention also concerns a method for forming such images.

BACKGROUND ART

In view of several recent incidents, manufacturers of over-the-counter drugs have become concerned that their products be sold in tamper-evident or tamper-resistant packages. The purpose of such security measures is to verify that the container has not been opened and thus that the contents have not been tampered with in some way. The measures must be inexpensive enough to be produced in bulk and should dependably provide a readily apparent indication of tampering.

A low cost seal for a container is provided by gluing paper across its opening. However, it usually is possible to peel off the paper and then reseal it, leaving an appearance quite similar to that of an unopened article. More sophisticated seals are caps that must be permanently structurally altered in order to be opened, as taught in U.S. Pat. Nos. 3,913,772 (Ochs); 4,446,979 (Goch); 4,457,437 (Heath); and 4,474,304 (Jacobs). Also known are seals which provide visual or audible indication whether a desired vacuum or pressure is intact, as taught in U.S. Pat. Nos. 3,152,711 (Mumford et al.); 3,160,302 (Chaplin); and 3,443,711 (Olson). U.S. Pat. No. 4,480,749 (Lauris et al.), shows thermoplastic seals made secure with temperature indicators.

Tamper-resistance and counterfeit-resistance are also desired for embossed cards, such as credit cards. One frequently encountered form of fraud is the alteration of the embossed characters on a card, thereby changing the account number or expiration date indicated thereon. One security technique commonly used to combat such fraud involves "tipping", i.e., color coating the raised portions of the embossed characters. However, this coating is often easily removed, following which the original characters may be flattened and the card re-embossed with new characters that may then be colored to give the card a genuine appearance. Another common security measure is the use of a material that stress-whitens, such as is seen in labeling strips and some bank and credit cards. Flattening of the raised area may cause the card to revert to its original color, however, and the card may then be stamped with fraudulent information.

There is a need in both the over-the-counter drug industry and in the credit card industry for better counterfeit-resistant security measures to indicate attempted tampering. Such measures should provide a clear, easily read indication of tampering and should be resistant to imitation or duplication designed to circumvent the intended function.

Other Background Art

Sheeting in which an image of a pattern or legend is built into the sheeting has found a number of important uses, particularly as distinctive labels useful to authenticate an article or document. Such sheetings as taught in U.S. Pat. Nos. 3,154,872 (Nordgren); 3,801,183 (Sevelin et al.); 4,082,426 (Brown); and 4,099,838 (Cook et al.), have found use as validation stickers for vehicle license plates and as security films for driver's licenses, government documents, phonograph records, tape cassettes, and the like. These references teach that the legends must be incorporated into the sheeting when the sheeting is being made.

U.S. Pat. No. 4,200,875 (Galanos) discloses a method of forming directional images in retroreflective sheeting which comprises a monolayer of glass microspheres and a reflective masking layer. In that method, laser irradiation of the retroreflective sheeting in an imagewise fashion causes structural alterations or modifications in the sheet which are viewable as a directional image.

Hockert et al., Jap. Application No. 19824/84, filed Feb. 6, 1984, Kokai No. 148004/84, laid open Aug. 24, 1984, discloses a sheet which comprises a monolayer of closely spaced transparent microlenses and a set of axial markings, each marking disposed at the rear of a microlens such that the set of markings is visible as an image only when viewed within a predetermined conical field of view.

Both of the last two references teach that directional images may be formed in the sheetings after the sheetings are constructed. The latter reference discloses a sheeting wherein certain useful optical effects may be achieved, such as images which are colored, rather than just black and white. Also, sheets of the latter reference are useful as transparent overlays to authenticate documents or articles to which they might be adhered.

SUMMARY OF INVENTION

This invention provides a convenient, economical, counterfeit-resistant means of reliably indicating attempted tampering with articles such as containers or embossed cards by virtue of a sheet that is applied to the articles. The sheet of the invention may also be used as a means for verifying the authenticity of an article to which it is attached. In addition, a sheet containing one or more contour-dependent, directional images may have many other applications, such as a sign with changeable messages. The invention also provides a method for forming such sheets and articles bearing them.

In brief summary, the novel sheet comprises:
(a) a monolayer of closely spaced transparent microlenses, which are preferably glass microspheres;
(b) means for securing the microlenses to said sheet in a monolayer arrangement; and
(c) a set of axial markings, each marking being located at the rear of a microlens such that the set of markings in visible from the front of the sheeting as an intact image only when the sheet is in substantially a predetermined contour and is viewed within a predetermined conical field of view.

"Axial markings" are defined as visibly distinctive structures of limited area, such as coated spots, openings in otherwise continuous layers, deformities within a layer, or deformities within individual microlenses, whose center points are respectively located on axes that extend through the optical center of individual microlenses and intersect at a common viewing point or line, or are parallel to one another.

DETAILED DESCRIPTION OF INVENTION

To form a sheet containing a contour-dependent, directional image, a sheeting comprising a monolayer of microlenses, and, in some embodiments, further comprising a substantially opaque specularly reflecting layer or masking layer, is arranged in a selected contour. Such sheetings are sometimes referred to herein as microlens sheeting. The selected contour may be defined by a surface, such as the area of embossing on an embossed card, to which the microlens sheeting is adhered as a surface-conforming overlay, or the sheeting itself may assume a contour. For instance, microlens sheeting may be used to form a vacuum seal for a container; such seals typically have a concave contour. In this regard, it is useful for the microlens sheeting to be sufficiently flexible to conform to an underlying surface or respond to a contouring force while retaining its structural integrity and optical properties.

When the sheeting is arranged in the desired contour, a beam of highly collimated light, such as a laser beam, is directed at the sheeting in an imagewise fashion at a selected angle of incidence, thereby forming an axial marking at the rear of each microlens that the beam strikes. Q-switched, pulsed laser beams are typically the most efficient type of collimated light for forming axial markings in microlens sheeting. The set of axial markings is visible as an intact image only when the sheet is in substantially the contour in which it was irradiated and is viewed within a conical field of view that is centered on the angle of incidence at which the sheeting was irradiated. Additional contour-dependent, directional images, each viewable within a different conical field of view or when the sheet is arranged in a different contour, may be formed in the sheet according to the same method.

The collimated light may scan the entire face of the microlens sheeting, or only selected portions thereof, such as through a mask, to form a set of axial markings; alternatively, the set of axial markings can be formed by irradiating the sheeting in a specially shaped scanning pattern. Whether the image extends uniformly across the whole sheet or merely a portion thereof, it has the visibly distinctive contour-dependent, directional quality which is an object of this invention.

The precise location or level within the sheeting at which the axial markings are formed is determined by the construction of the microlens sheeting and the method used for forming directional images. For instance, each axial marking may be a deformity formed in a microlens itself, or an opening formed in a layer such as a specularly reflecting layer or reflective mask layer which is immediately adjacent thereto or moderately spaced therefrom. As used herein, "at the rear of" is meant to refer to all such locations.

The angle of incidence at which the collimated light is directed at the microlens sheeting determines the central axis of the conical field of view within which the resultant image is visible. The angular width of that conical field of view is related to the size of the axial markings, which is determined in part by the energy density of the irradiation applied to the sheeting to create the markings. If a beam with higher energy density is used to form the axial markings, the image will have a wider conical field of view. Similarly, if a beam with a lower energy density is used, the image will have a narrower conical field of view. When sheeting comprising a monolayer of microspheres substantially all having an average diameter of approximately 50 to 60 micrometers is irradiated to form axial markings from 3 to 10 micrometers in diameter, the contour-dependent, directional image is viewable only within a conical field approximately 10 to 20 degrees in width.

The set of axial markings is visible as an intact image only when the imaged sheet is in substantially the same contour as the one in which it was imaged and is viewed from within the predetermined conical field of view. When the contour of the sheet is changed, the spatial relation between the various axial markings that compose the image is changed, thereby distorting the image's appearance, or if the change of contour is of sufficient magnitude, preventing any more than portions of the image from being simultaneously visible at any angle.

The sensitivity of the image to changes in the contour of the sheet is inversely related to the angular width of the conical field of view within which the image is visible. Images that are visible only across very narrow conical fields of view are sensitive to minor changes in contour. Such images, however, typically have less contrast to the surrounding background and are somewhat more difficult to locate than images that are visible across very wide conical fields of view. Images that are visible across very wide conical fields of view may remain intact even after substantial changes in contour. The optimum width of the conical field of view and related sensitivity of the image to changes in the contour of the sheet are dependent upon the particular application and may be readily determined by experiment. Sheets used to authenticate embossed cards, for instance, would be most useful if sensitive to minor changes in contour, whereas sheets used as changeable signs where high visibility over a wide field may be desired should be less sensitive to changes of contour.

The microlens sheeting used in this invention should be flexible and remain structurally sound, i.e., the microlenses should remain securely anchored to the sheeting and not separate from the sheeting when the sheeting is shaped into various contours. The degree of flexibility required is determined by the intended application. The means for securing the microlenses to the sheet may be a layer of binder material, such as a polymeric material, or some other construction by which the microlenses are held in a monolayer arrangement, as, for instance, in U.S. Pat. No. 3,503,315 (de Montebello).

Among the types of microlens sheeting which may be useful in this invention are "exposed-lens" sheeting, wherein the microlenses protrude from the front of the sheeting; "encapsulated-lens" sheeting, disclosed in U.S. Pat. No. 3,190,178 (McKenzie), which is similar to exposed-lens sheeting in that the microlenses protrude from a binder layer, but further comprises a transparent film covering the microlenses; and "embedded-lens" sheeting, wherein the microlenses are embedded in a transparent protective layer. The microlenses in encapsulated-lens and embedded-lens sheeting may be less likely to separate from the sheeting than those in exposed-lens sheeting when the sheeting is shaped into severely convoluted contours; however, such sheetings tend to be more difficult to bend or conform to underlying contours than exposed-lens sheeting. Retroreflective embedded-lens and encapsulated-lens sheetings remain retroreflective even when wet, whereas exposed-lens sheeting does not, making encapsulated-lens and embedded-lens sheetings preferred for many outdoor applications, such as for traffic signs. In most applications of this invention, the microlens sheeting is preferably retroreflective, because the images formed therein are typically more easily verified than those formed in non-retroreflective sheeting.

The microlenses are preferably spherical, so that they may be imaged from a wide range of angles of incidence, and if the sheeting is retroreflective, it will be retroreflective over a wide range of angles. An example of sheeting comprising microlenses that are not spheres is disclosed in de Montebello. Glass microlenses are preferred because they tend to be more durable than microlenses formed from other materials.

Microspheres having a refractive index within the range of 1.5 to 2.7 are useful; however, presently available microspheres with refractive indices above 2.4 may introduce coloring. Colorless clarity may be preferred in some applications, such as where a sheet containing the contour-dependent, directional image is adhered as a transparent overlay over information on a document.

The microspheres preferably have an average diameter of 10 to 100 micrometers, and ideally have a substantially uniform diameter of approximately 50 to 60 micrometers. If the microspheres are much larger, the sheeting tends to become thicker and more difficult to bend, and images formed therein will have less resolution. If the microspheres are much smaller, images formed on the sheeting will have greater resolution, but it is more difficult to distribute the microlenses uniformly when constructing the sheeting. As the microspheres become smaller than approximately 10 to 20 micrometers in diameter, diffraction losses may cause the sheeting to be less brightly reflective, thus reducing the contrast between the image and the surrounding background, thereby rendering the image more difficult to locate.

This invention may be used to provide a secure, tamper-evident means of providing a readily apparent indication that a container, such as a bottle or jar, has been opened or that an attempt to open it has been made. Many such containers are presently sealed under a vacuum, which typically causes the seal of the container to assume a concave shape. When the container is opened, the vacuum is lost and the shape of the seal changes. If the seal comprises a sheet containing a contour-dependent, directional image, the image is disrupted, providing a readily apparent indication that the container has been opened. Conveniently, microlens sheetings may be made in physically unsubstantial or flimsy form, so that an attempt to tamper with the seal is likely to cause a tear or other obvious physical damage to the sheet in addition to disrupting the contour-dependent, directional image contained therein.

The image may be a special safety message explaining the importance of its being intact or a pattern such as a company logo or trademark with accompanying directions on the container explaining how to verify that the seal is intact. The image is preferably of sufficient detail and size that it cannot be easily imitated and that disruptions will be discernible. The image should not, however, be so complicated that changes induced by tampering will not be noticed by the intended beneficiary, the consumer. A photographic image is ideally suited to indicate tampering. The familiar format and subtle detail which may be achieved with such an image provide a very reliable means for indicating tampering because changes in the image are readily apparent. A photographic image can be formed by irradiating the sheeting through a half-tone mask that contains a photographic image.

Sheets of the invention containing contour-dependent, directional images may be useful as a counterfeit-resistant means of authenticating an embossed card, such as a credit card, and providing a readily apparent indication that the embossing has not been tampered with.

A sheet containing a contour-dependent, directional image may also provide a means to authenticate a security pass. An exemplary embodiment is a security pass in the form of a card bearing a picture of the card-holder and pertinent written information over which is adhered a substantially transparent, preferably retroreflective, microlens sheeting that does not interfere with the legibility of the underlying matter. Means of authenticating the card is provided by arranging the card, with adhered microlens sheeting, in a selected contour and forming a contour-dependent, directional image therein. This image may be formed in such sheeting after it has been adhered to the card by irradiation with a laser beam that has a short pulse duration, e.g., less than 50 nanoseconds, and sufficient power to cause deformation of each of the microlenses that the beam strikes. Typically, in the case of glass microlenses, a laser with a pulse duration of about 10 nanoseconds, adjusted so as to provide a power density of approximately 1.0 megawatt per square centimeter of the sheeting's surface is useful. Suitable lasers include pulsed, electro-optically Q-switched Nd:YAG (Neodymium-:Yttrium Aluminum Garnet) lasers, such as the "Quanta-Ray DCR-2 Nd:YAG Laboratory Laser System" available from Spectra-Physics, Inc. of San Jose, Calif. The formation of directional images in substantially transparent microlens-based sheeting is disclosed in application Ser. No. 733,066, filed May 1, 1985, commonly assigned herewith.

Alternatively, the contour-dependent, directional image may be formed in a nontransparent microlens sheeting which is first arranged in a selected contour, irradiated with highly collimated light to form the desired image, rendered transparent by removal of the specularly reflecting or masking layer, e.g., by etching as disclosed in the aforementioned Hockert et al. application, and finally, is adhered to the face of the card that is to be authenticated.

The card may thereafter be authenticated by arranging it in the selected contour and verifying that the image is intact. Greater security may be achieved by using a contour-defining template and mechanical reading device to read the directional image. When such devices are used, contour-dependent, directional images that have very narrow conical fields of view, and are thus more sensitive to changes in contour, may be selected.

Sheets containing more than one set of axial markings to provide more than one contour-dependent, directional image may be formed. When two images are formed at the same contour, it will usually be preferable to select angles of incidence that are sufficiently different that the respective conical fields of view of the two images do not overlap or interfere with each other.

Alternatively, an additional set of axial markings may compose a contour-dependent, directional image that is viewable only when the sheet is arranged in a contour different from the contour wherein the first image is visible.

A sheet containing a contour-dependent, directional image may be used as a sign wherein the message is rendered visible or not as desired by changing the shape of the sign. For such an embodiment, it is convenient to adhere a microlens sheeting to a contour-defining means, such as a metal or plastic panel, which while being flexible, will assume a contour in which the contour-dependent image is visible and at least one other contour. For example, a metal panel that flexes from a concave to a convex contour is suitable. The sheeting may be adhesively bonded to the metal panel, and one or more sets of axial markings formed therein, each set composing a contour-dependent, directional image viewable in a contour that the panel assumes. Another suitable metal panel may be normally flat, at which contour one contour-dependent, directional image is formed; while one or more other contour-dependent, directional images are formed at one or more cylindrical contours.

Several different embodiments of microlens sheeting may be used to impart different advantages to the practice of this invention. For instance, as disclosed in the aforementioned Hockert et al. application, certain axial markings may be impregnated with a colored coating composition to provide a colored image. Such sheeting could be used to provide a sign bearing two or more contour-dependent, directional images wherein the images have different colors thereby rendering the images more distinguishable in the same fashion that traffic lights are color coded.

Sheets bearing contour-dependent, directional images may be used to determine if an article is in a particular contour, or may be arranged in predetermined contour to render a particular image viewable. Other applications wherein sheets bearing contour-dependent, directional images may be useful will be obvious to those skilled in the art.

DESCRIPTION OF DRAWINGS

The invention will be further explained in the drawing, wherein:

FIG. 3 shows a cross section of a portion of a container and its screw-on cap onto which a microlens sheeting has been adhered to overlap the cap and neck of the container, the sheeting having a contour-dependent, directional image formed therein to provide a tamper-evident means of verifying that the cap has not been tampered with;

FIG. 5 shows a cross section of an embossed card having a microlens sheeting adhered to the surface thereof so as to conform to the surface of the card in an embossed area, a contour-dependent, directional image has been formed in the microlens sheeting to provide a tamper-evident means of authenticating the card and the embossing pattern it bears; and FIG. 6 shows the cross section of the embossed card shown in FIG. 5 wherein the pattern of embossing has been altered, causing a disruption of the contour-dependent, directional image thereby providing a readily apparent indication that the embossing has been tampered with.

In FIG. 1, container 10 is provided with vacuum seal 12, which comprises microlens sheeting 14 and underlying adhesive layer 16. The vacuum in the container has caused the seal to assume a concave contour.

A contour-dependent, directional image may be formed in the microlens sheeting by irradiating sheeting 14 with a beam 18 of highly collimated light. The angle of incidence shown here is essentially normal to the plane of the top of the container. The beam is directed through a mask 20 so the sheeting is irradiated in an imagewise fashion to form an imagewise set of axial markings. Lines A, B, C, D, and E represent portions of the irradiation which is transmitted through the mask and can also represent the central axes of the conical fields of view of the axial markings formed by those portions of irradiation.

When mask 20 is removed, the set of axial markings formed is viewable as an intact image from within a conical field of view centered on the angle of incidence of the irradiation if the sheet is in substantially the contour it was in when the axial markings were formed. When the image is intact, all portions of the image are simultaneously viewable within said conical field of view.

A cap may be screwed onto the container, secured by the threads 22 shown on the side of the neck of the container. A cap is useful to protect the seal from accidental damage.

Figure 1:
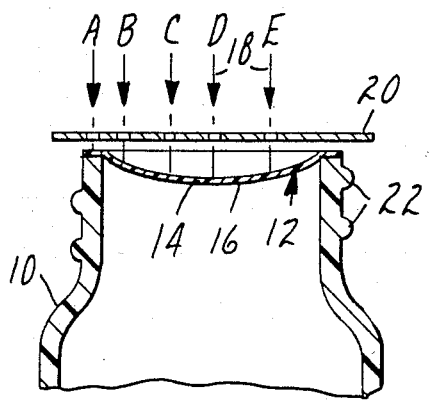
FIG. 1 shows a cross section of the upper portion of a container having a microlens sheeting adhered across the mouth thereof as a vacuum seal in which a contour-dependent, directional image is formed to provide a tamper-evident means of verifying whether the seal has been opened.
Figure 2:
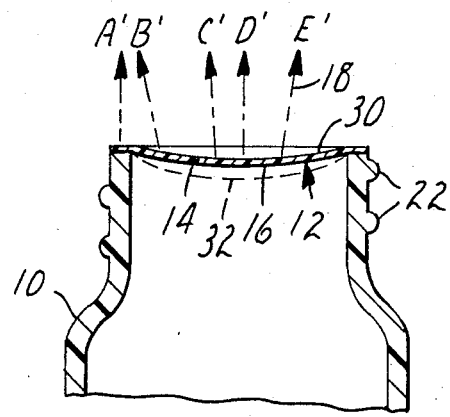
FIG. 2 shows a cross section of the container and seal shown in FIG. 1 after the seal has been breached, causing disruption of its contour-dependent, directional image, thereby providing a readily apparent indication of tampering.

As shown in FIG. 2, if the seal is tampered with or opened, the vacuum will be lost, so that the seal will assume a contour 30 different from its original one 32. The different contour alters the spatial orientation between different parts of the sheet, thereby disrupting the image contained therein. The image is no longer intact, as shown by the nonparallel arrangement of lines A', B', C', D', and E', each of which indicates the axis of the conical field of view at which a portion of the image can be viewed. The conical fields of view of the different portions of the image no longer overlap; therefore, all parts of the image are not simultaneously visible from any perspective, providing a readily apparent indication that the seal has been tampered with.

Figure 3:
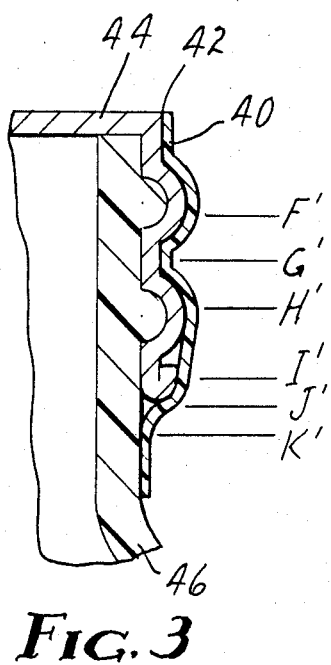

FIG. 3 shows a microlens sheeting 40 adhered with an adhesive 42 to overlap the cap 44 and neck 46 of a container to provide a tamper-evident means of sealing the container according to the invention. The microlens sheeting has been irradiated to form a contour-dependent, directional image. Lines F', G', H', I', J', and K' represent the central axes of the conical fields of view of portions of the image. If the sheet is arranged in substantially the same contour it was in when the set of axial markings was formed, the image will be intact, represented by the parallel arrangement of lines F', G', H', I', J', and K'.

Figure 4:
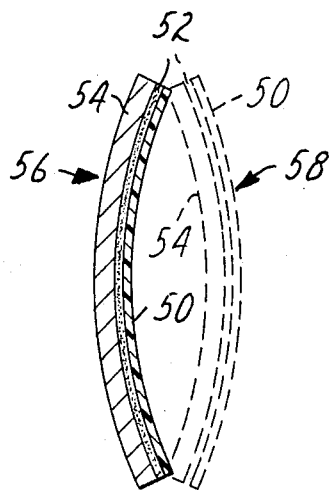
FIG. 4 shows a cross section of a metal panel to which a microlens sheet has been adhered to provide a sign with a changeable message.

FIG. 4 shows a microlens sheeting 50 having an adhesive layer 52 on the back side adhered to a metal panel 54 that is capable of assuming a concave contour 56 and a convex contour 58. A set of axial markings that is viewable as an intact image when the metal panel is in its concave contour is disrupted when the panel assumes the convex contour.

FIG. 5 shows a cross section of an embossed card 60, to the surface of which a microlens sheeting 62 comprising a monolayer of microspheres 64, a binder layer 66, and a layer of adhesive 68, was adhered before embossing. The card and adhered microlens sheeting have been embossed with desired characters 70, 72, such as with the account numbers on a credit card, and the sheeting has assumed a nonplanar contour. The microlens sheeting has been stretched in the embossed areas to conform to the new contour of the surface of the card.

A tamper-evident means of authenticating the card and the embossing pattern it bears is provided by irradiating the sheeting, such as with a laser having a short pulse duration and sufficient power to cause deformation of microlenses as discussed above, to form a set of axial markings that is viewable as a contour-dependent, directional image. The angle of incidence, which defines the central axis of the conical field of view, is shown here as essentially normal to the card. Any other useful angle at which the sheeting could have been imaged might have been chosen. Each of the lines represents the central axis of the conical field of view of an axial marking. When the sheet is arranged in the contour it was in when the contour-dependent, directional image was formed, the image will be intact, represented by the parallel arrangement of the lines.

In FIG. 6, the embossing pattern shown in FIG. 5 has been altered by removing characters 70, 72 and adding character 74. Due to the change of the contour of the card, the spatial arrangement between the individual axial markings has been altered, thereby disrupting the image, as represented by the nonparallel arrangement of the lines. The image is no longer intact due to disruptions caused by both the removal of original, authentic embossing, and the addition of new, counterfeit characters, thereby providing a readily apparent indication of tampering, an object of this invention.

These Figures, which are not to scale, are representations of only some of the embodiments in which sheets containing contour-dependent, directional images may be useful. They are intended to be only nonlimiting aids to the written description of this invention.

The invention will now be further explained by the following illustrative examples.

EXAMPLE 1

This example discloses one embodiment of the invention that provides a secure, tamper evident means of indicating that a container has been opened or that an attempt to open it has been made.

A piece of SCOTCHLITE Brand High Gain Reflective Sheeting No. 7610, available from Minnesota Mining and Manufacturing Company, was placed microlens side down on a flat surface. The sheeting comprises a monolayer of closely spaced transparent glass microspheres, substantially all of which have diameters of approximately 50 to 70 microns and a refractive index of approximately 1.9. The microspheres have a chemically deposited reflective layer on the rear surface and are partially embedded in a polymeric binder containing a black pigment. The back side of the sheeting is coated with a pressure-sensitive adhesive which is protected by a release liner. The release liner was removed to expose the pressure-sensitive adhesive A glass 100 milliliter bottle having a mouth approximately 4.5 centimeters in diameter was heated briefly to warm the bottle and the air contained therein. The mouth of the bottle was then pressed against the exposed adhesive, thereby causing the sheeting to adhere to the bottle and form a seal. The sealed bottle was then allowed to cool to room temperature. As the air in the bottle cooled and contracted, the sheeting was pushed into the bottle mouth, assuming the familiar concave shape of a vacuum seal. The sheet of 7610 sheeting was trimmed to remove the excess portions that extended beyond the mouth of the bottle.

A flat mask bearing a repeating legend as open areas in a reflective aluminum vapor coat on a transparent film was placed across the mouth of the bottle and seal. The mask was prepared according to U.S. Pat. No. 4,314,022 (Fisch).

The sheeting was then irradiated through the mask with the beam from a Model 512 Q Neodymium:Yttrium Aluminum Garnet (Nd:YAG) Q-switched laser available from the Control Laser Corporation of Orlando, Florida. The wavelength of the beam emitted by the Model 512 Q laser was approximately 1.064 micrometers. The laser was adjusted to emit a beam with an average power of approximately 10 watts, a pulse rate of approximately 3.4 kilohertz, a pulse duration of approximately 200 nanoseconds, and a diameter at the surface of the mask of approximately two millimeters.

The beam was scanned across the mask and bottle seal at an angle of incidence to the mask of approximately 0°, i.e., essentially normal, at a speed of approximately three meters per second, by scanning the beam across the mask in one direction then moving it approximately one millimeter in a transverse direction before again scanning across the mask.

When the entire mask had been irradiated in this fashion, the mask was removed. The repeating legend was visible as a dark image within a conical field of view which was approximately 20° wide and centered on the angle of incidence of the laser irradiation. The repeating legend was visible over the entire surface of the seal from any angle within this conical field of view. The image was visible in both ordinary diffused light and under retroreflective light conditions.

In accordance with this invention, the image is intact only if the seal is in substantially this original contour and is viewed within the conical field of view. If the contour of the seal is changed, as occurs if the seal is removed and then reattached, the image will no longer be intact.

A second bottle seal was prepared and an image formed according to the method described above. Similar results were achieved.

To simulate tampering, a small section of the seal on the second bottle was lifted from the rim of the bottle, thereby breaking the vacuum seal and allowing air to enter the bottle. Because of the loss of the vacuum the seal was no longer in the same concave contour, but assumed a less concave, nearly flat contour with some undulations.

The repeating legend was no longer visible over the entire surface of the seal from any one viewing angle. From within the original conical field of view, the legend was visible only in a region approximately two centimeters in diameter located in the center of the seal. When viewed at other angles slightly off normal, the image on different portions of seal was visible.

EXAMPLE 2

This example discloses another embodiment of this invention used to provide a secure, tamper-evident means of indicating that a container has been opened or tampered with.

A piece of 7610 sheeting like that used in Example 1 was cut into a strip approximately one centimeter wide and 20 centimeters long, after which the protective liner was removed from the back of the strip to expose the underlying adhesive. The strip was then wrapped tightly around a screw-top bottle, to which the cap had been previously screwed on, overlapping the edge of the cap and adjacent bottle neck. The hand pressure and tension applied caused the strip of sheeting to stretch and conform to the contour of the underlying cap and bottle neck.

A flat mask, bearing the legend "3M", was made in similar fashion as that used in Example 1. The mask was placed tangent to the strip of microlens sheeting wrapped around the bottle top.

The mask and strip of sheeting were irradiated with a laser beam as described in Example 1 to form a set of axial markings that was visible as an image "3M". The image was visible within a conical field approximately 20° wide, the central axis of which was the angle of incidence of the irradiation which formed the axial markings.

The bottle was rotated about its axis approximately 45° and the mask moved approximately 45° in the opposite direction and placed tangent to the strip of microlens sheeting as for the first scanning sequence. This region was irradiated in the same fashion as the first region. This procedure was then repeated until a series of images had been formed around the seal. Each image had an appearance similar to the first one formed.

A second bottle was prepared in the same manner as the first. Similar results were achieved.

The strip of microlens sheeting on the second bottle was removed to simulate tampering. The strip was very difficult to remove and tore easily despite the attempt to remove it without damaging it. One portion of the strip was successfully removed and reattached to the bottle. The legend "3M" was disrupted because the contour which it assumed was substantially different from the original contour of that portion when the image was formed, providing a readily apparent indication that the bottle had been tampered with.

EXAMPLE 3

This example discloses an embodiment of this invention used to provide a secure, tamper-evident means of indicating that the embossing on an embossed card has been tampered with.

A piece of SCOTCHLITE Brand No. 580-10 WAFT reflective sheeting, available from Minnesota Mining and Manufacturing Company, was adhered to the surface of a rigid sheet of polyvinyl chloride (PVC). The No. 580-10 WAFT sheeting is a wide angle flat top sheeting which comprises a monolayer of closely spaced transparent glass microspheres, substantially all of which have diameters of approximately 50 to 75 micrometers and a refractive index of approximately 2.26. The microspheres are partially embedded in a transparent polymeric space coat. The front surfaces of the microspheres are embedded in a polymeric top coat that has a flat surface and is approximately 2.5 mils thick. The space coat conforms to the rear surfaces of the microspheres and on the rear surface of the space coat there is a reflective aluminum vapor coat that is disposed at approximately the focal length from the microspheres. On the opposite side of the aluminum vapor coat is a layer of a carboxylic-based adhesive upon which is disposed a layer of a rubber-based adhesive, which is in turn covered with a paper release liner.

The sheet of PVC, which was approximately 24.5 mils thick, was obtained from Tenneco Polymers, Incorporated, and is similar to the material commonly used for credit cards.

The WAFT sheeting was laminated to the sheet of PVC by laying the sheeting on the PVC after removing the paper release liner and compressing them on a platen press for approximately 10 minutes at a temperature of approximately 270° F. under approximately 100 to 250 pounds per square inch of pressure.

Individual blanks measuring approximately 2⅛ inches by 3⅜ inches were die cut from the laminate and then embossed using a standard manual card embosser.

The embossed blank cards were then irradiated with the beam from the same kind of laser used in Examples 1 and 2. The entire surface of the card was raster-scanned to form a contour-dependent, directional image therein. The resultant image was visible as a uniform pattern when viewed within a conical field of view centered upon the angle of incidence of the irradiation, under either ordinary diffuse light or retroreflective conditions.

The imaged cards were immersed in boiling water for a few seconds to soften the PVC. A polyethylene terephthalate film was placed on each side of the cards, which were then pressed by hand between two metal plates to flatten the embossing. After being allowed to cool, the flattened cards were re-embossed in the regions where previously embossed with different alphanumeric data.

When viewed under either ordinary diffuse light or retroreflective conditions, the previously uniform directional image was disrupted in both areas where the original embossing had been flattened and where the new embossing had been added. The contour-dependent, directional image thus provided a readily apparent indication that the embossing on the card had been altered.

Various modifications and alterations of this invention will become apparent to those skilled in the art without departing from the scope and spirit of this invention.

What is claimed is:

1. A contour-dependent, directionally imaged sheet which comprises:
   (A) a monolayer of closely spaced transparent microlenses,
   (B) means for securing said microlenses to said sheet in a monolayer arrangement; and
   (C) a set of axial markings, each axial marking being located at the rear of a microlens such that the set of said axial markings is visible from the front of the sheeting an intact image only when said sheet is in substantially a predetermined nonplanar contour and is viewed within a predetermined conical field of view.

2. The sheet of claim 1 wherein said microlenses are microspheres.

3. The sheet of claim 2 wherein said microspheres have a refractive index of about 1.5 to 2.7.

4. The sheet of claim 1 wherein said microlenses are glass.

5. The sheet of claim 1 wherein said sheet is retroreflective.

6. The sheet of claim 1 further comprising a substantially opaque layer underlying said microlenses.

7. The sheet of claim 1 wherein said sheet is substantially transparent.

8. The sheet of claim 1 wherein said sheet further comprises a second set of axial markings, each disposed at the rear of a microlens such that said second set of axial markings is visible as an intact image only when said sheet is viewed within a second predetermined conical field of view.

9. The sheet of claim 1 wherein said sheet further comprises an additional set of axial markings, each disposed at the rear of a microlens such that said additional set of axial markings is visible as an intact image only when said sheet is in substantially a predetermined contour different from said predetermined nonplanar contour.

10. The sheet of claim 9 wherein said additional set of axial markings is visible as an intact image within said predetermined conical field of view.

11. The sheet of claim 1 which is attached across the mouth of a container under a vacuum, said vacuum determining said predetermined nonplanar contour.

12. The sheet of claim 1 which is attached across the mouth of a container under a positive pressure, said positive pressure determining said predetermined nonplanar contour.

13. The sheet of claim 1 which is adhered as a surface conforming overlay across at least a portion of the embossed face of an embossed card, the embossing defining said predetermined nonplanar contour.

14. The sheet of claim 1 which is adhered to overlap a container and the cap which seals such container so as to conform to the exterior contour of said container and cap, said exterior contour defining said predetermined nonplanar contour.

15. A document to which is adhered the sheet of claim 1 wherein said sheet is substantially transparent and is adhered as an overlay to an information area of the document without interfering appreciably with the legibility of said information.

16. The sheet of claim 1 wherein said sheet is attached to a contour-defining means, said contour-defining means being movable between at least two positions in which said sheet assumes differing predetermined contours, including said predetermined nonplanar contour.

17. The sheet of claim 16 wherein said sheet further comprises a second set of axial markings, each disposed at the rear of a microlens such that said second set of axial markings is visible as an intact image only when said sheet is in substantially a second contour other than said predetermined nonplanar contour.

18. The sheet of claim 17 wherein said second contour is nonplanar.

19. A method comprising:
(A) arranging into a nonplanar contour a sheeting comprising a monolayer of closely spaced transparent microlenses and a means for securing said microlenses to said sheeting in a monolayer arrangement; and
(B) directing highly collimated light in an imagewise fashion at a selected angle of incidence to the face of the sheeting to form an axial marking at the rear of each microlens which said light strikes, which markings compose a set of axial markings which is visible as an intact image only when said sheet is in substantially said nonplanar contour and is viewed within a conical field of view, the central axis of which is the angle of incidence of the irradiation.

20. The method of claim 19 wherein said sheeting further comprises a substantially opaque layer underlying said microlenses.

21. The method of claim 19 wherein arranging said sheeting into a nonplanar contour in Step (A) comprises adhering said sheeting across the opening of a container.

22. The method of claim 21 wherein arranging said sheeting into a nonplanar contour in Step (A) comprises adhering said sheeting to said container to seal the opening of said container.

23. The method of claim 21 wherein arranging said sheeting into a nonplanar contour in Step (A) comprises adhering said sheeting to an article which seals the container.

24. The method of claim 19 wherein said sheeting is adhered to the surface of a card and arranging said sheeting into a nonplanar contour in Step (A) comprises embossing said card thereby also embossing said sheeting.

25. The method of claim 19 wherein said highly collimated light is a pulsed laser beam.

26. The method of claim 25 wherein said pulsed laser beam scans the entire face of said sheeting.

27. The method of claim 19 further comprising after said Step (B):
(C) directing said highly collimated light in an imagewise fashion at a second selected angle of incidence to the face of said sheeting to form an axial marking at the rear of each microlens which said light strikes, which markings compose a second set of axial markings which is visible as an intact image only when said sheet is in substantially said nonplanar contour and is viewed within a second conical field of view, the central axis of which is said second selected angle of incidence.

28. The method of claim 19 further comprising after said Step (B):
($C_1$) arranging said sheeting into a different contour; and
($D_1$) directing said highly collimated light in an imagewise fashion at said selected angle of incidence to the face of the sheeting to form an axial marking at the rear of each microlens which said light strikes, which markings compose an additional set of axial markings which is visible as an intact image only when said sheet is in substantially said different contour.

29. The method of claim 19 further comprising, after said Step (B):
($C_2$) arranging said sheeting into a different contour; and
($D_2$) directing said highly collimated light in an imagewise fashion at a different selected angle of incidence to the face of said sheeting to form an axial marking at the rear of each microlens which said light strikes, which markings compose another set of axial markings which is visible as an intact image only when said sheet is in substantially said different contour and is viewed within a different conical field of view, the central axis of which is said different selected angle of incidence.

* * * * *